United States Patent [19]

Giannuzzi

[11] Patent Number: 4,890,779

[45] Date of Patent: Jan. 2, 1990

[54] AUTOMATIC SETTING TOOL FOR MASONRY ANCHORS

[76] Inventor: Louis N. Giannuzzi, 59 Dingletown Rd., Greenwich, Conn. 06830

[21] Appl. No.: 227,676

[22] Filed: Aug. 3, 1988

Related U.S. Application Data

[63] Continuation-in-part of Ser. No. 643,392, Aug. 23, 1984, Pat. No. 4,828,445.

[51] Int. Cl.$^4$ .................................................. B25D 17/00
[52] U.S. Cl. ..................................... 227/139; 227/147; 227/156
[58] Field of Search ......................... 227/139, 147, 156

[56] References Cited

U.S. PATENT DOCUMENTS

| 3,219,248 | 11/1965 | Krewson, Jr. ................. 227/147 X |
| 4,637,539 | 1/1987 | Turcott et al. ................. 227/147 X |

FOREIGN PATENT DOCUMENTS 365927  1/1932  United Kingdom ............... 227/147

*Primary Examiner*—Paul A. Bell
*Attorney, Agent, or Firm*—Michael Ebert

[57] ABSTRACT

An automatic setting tool operatively coupled to a standard, rotary-impact drill-hammer for driving the shaped shank of a single piece anchor having an enlarged head into a hole drilled in masonry. The tool includes a rod having a front striker section and a rear holder section, a shoulder being formed at the junction of these sections. The holder section of the rod is adapted either to slip onto a drill bit held in the chuck of the drill-hammer or to be directly gripped by this chuck, whereby the rod, as it is rotated by the drill-hammer, is caused periodically to undergo a forward and a reverse stroke. Telescoped over the striker section and slidable thereon is a locator sleeve that is urged by a helical spring interposed between the shoulder and the sleeve to an initial position at which the sleeve projects beyond the front end of the rod to define therewith a socket for nesting the head of the anchor. In operation, when the shank of the anchor is placed in the entry of the drilled masonry hole and the head thereof which is nested in the socket is struck by the striker section during each forward stroke to drive the shank further into the hole, the spring is then compressed and the depth of the socket is reduced without, however, dislodging the head of the anchor therefrom. As a consequence, the alignment between the tool and the anchor is maintained in the course of the driving action.

7 Claims, 2 Drawing Sheets

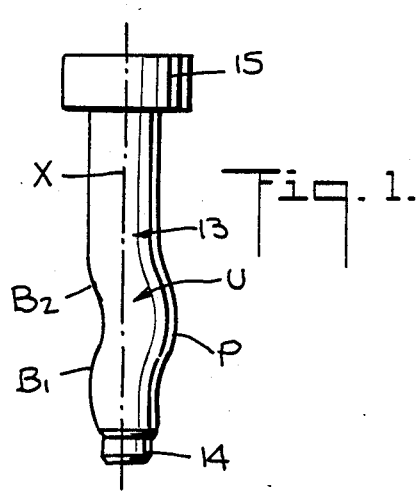
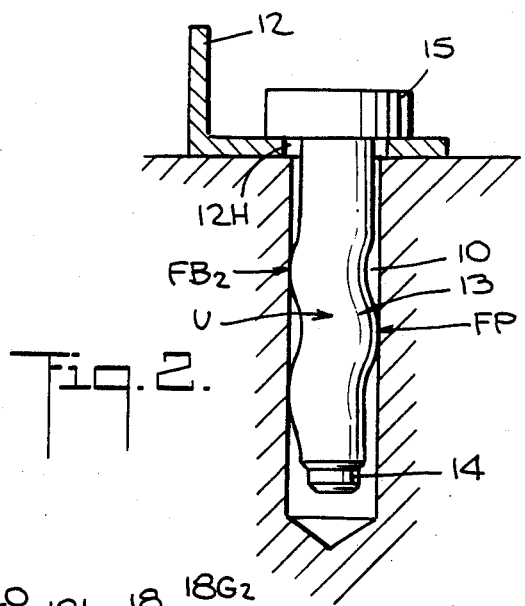
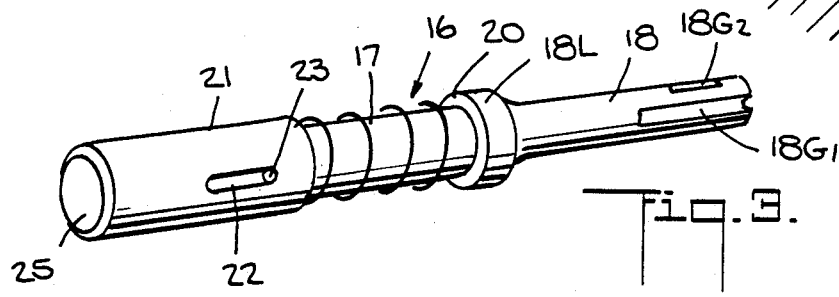
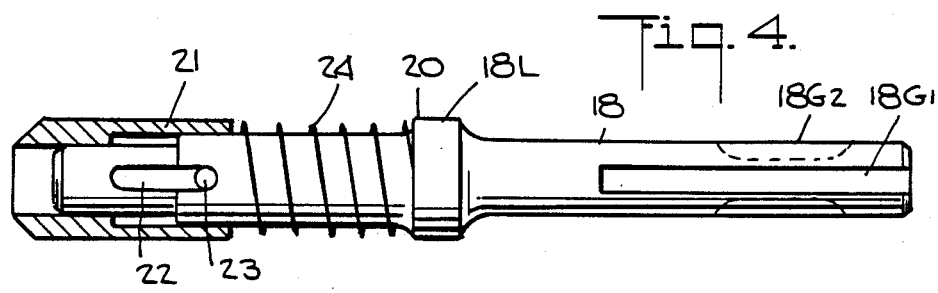
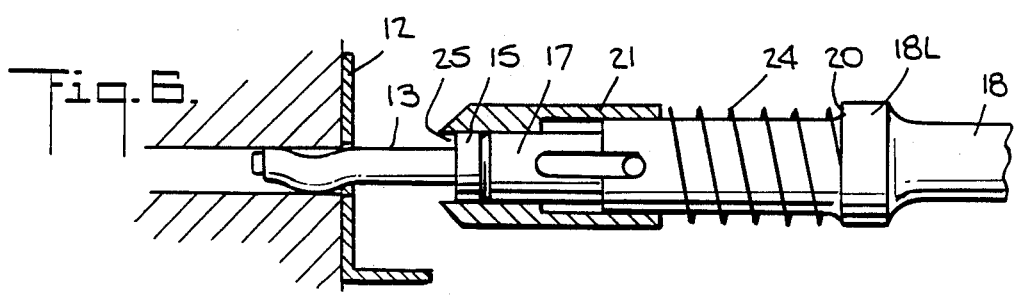
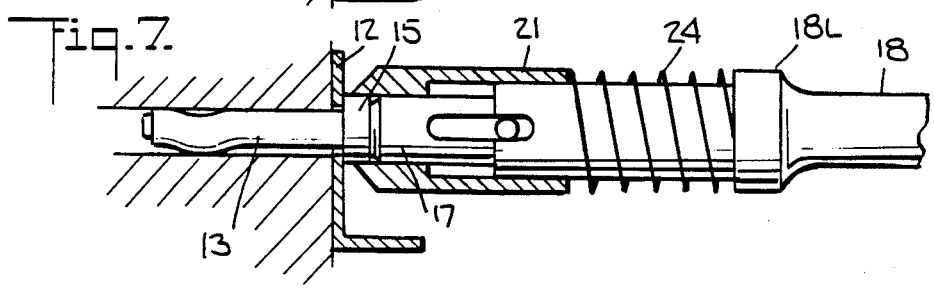

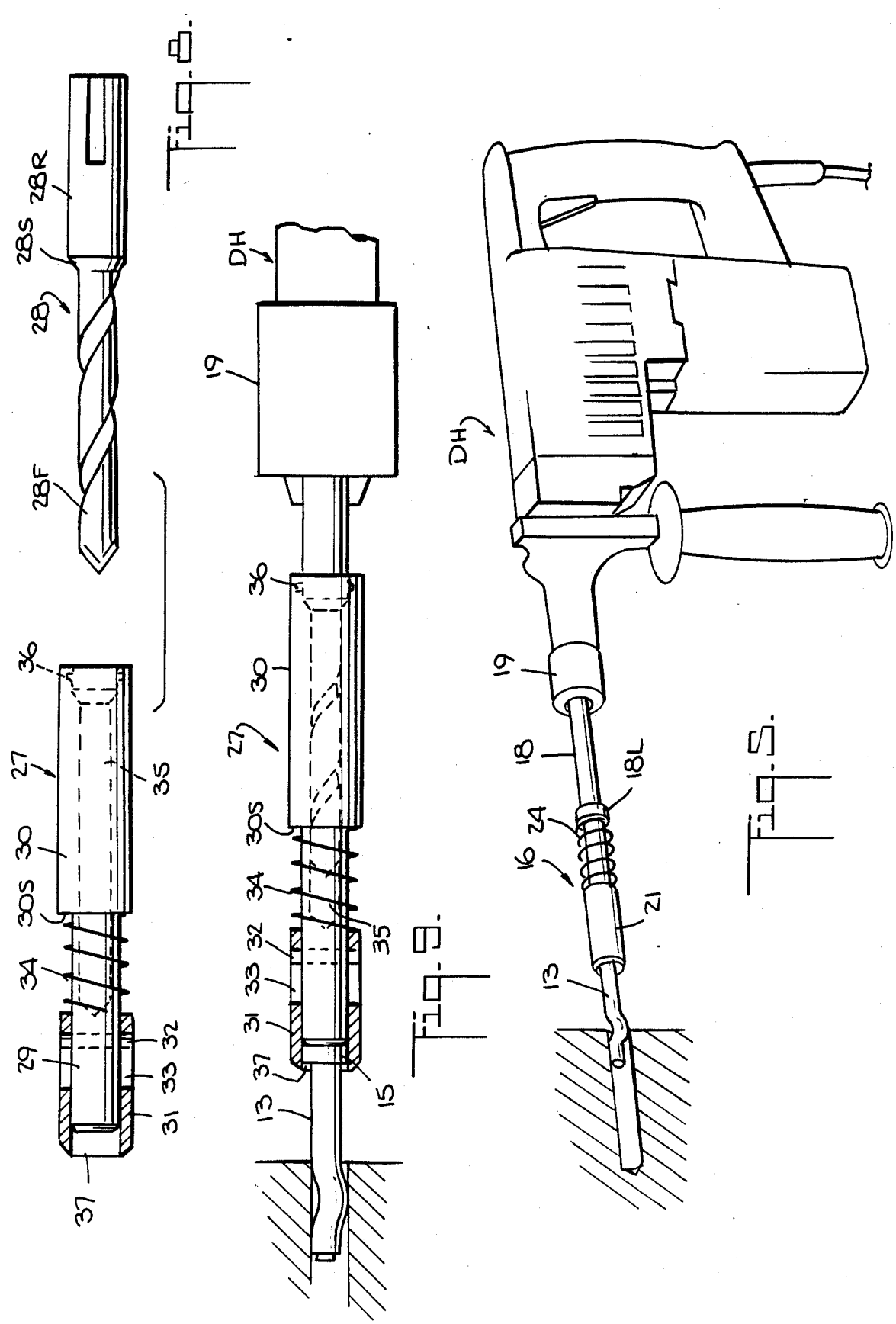

AUTOMATIC SETTING TOOL FOR MASONRY ANCHORS

RELATED APPLICATION:

This application is a continuation-in-part of my copending application Ser. No. 643,392, filed Aug. 23, 1984, entitled "Single Piece Pre-Shaped Wall Anchor," now U.S. Pat. No. 4,828,445.

BACKGROUND OF INVENTION

1. Field of Invention:

This invention relates generally to a setting tool for driving an anchor having a shaped shank into a hole drilled in masonry, and more particularly to an automatic tool operatively coupled to a standard rotary-impact drill-hammer which acts to hammer the shank of the anchor into the hole so as to cause it to lodge securely therein.

2. Status of Prior Art:

It is frequently necessary to secure fixtures or other parts against the surface of masonry. The term "masonry" as used herein encompasses not only brickwork and concrete but all rigid, non-metallic structural materials such as stone and plaster. The conventional practice for this purpose is to make use of an anchor bolt assembly which includes an expansible shell that is caused to expand when the bolt is turned by a wrench or other torque-producing tool, the expanded shell gripping the wall of the hole to securely retain the bolt therein.

Quite apart from the fact that conventional anchor bolt assemblies are composed of two or more cooperating components and are relatively expensive to manufacture, are the difficulties often experienced in making installations with such assemblies.

On a major construction site, it is generally necessary to use literally hundreds or thousands of multi-piece anchor bolts to secure such items as suspended ceilings, soffits and wall studding, or to make similar attachments requiring repetitive anchor bolt operations. In each of these, the bolt must be properly inserted in the hole and then turned by a tool until the bolt is locked in the hole by its associated expansible shell. This requires a significant degree of care by the installer. A large number of failures arise from unqualified installers who fail to drill an accurate hole or to adequately torque the anchor bolt. Moreover, there is no way of knowing whether the anchor bolt is not holding properly until it fails in services, and this may have tragic consequences.

Apart from the problem of improper installation, is the fact that with existing multi-piece anchor bolts, the installation of each bolt is a time-consuming operation. Since at a given site, this operation must be repeated over and over again, the operator in the course of a working day is only able to install a limited number of anchor bolts. This adds substantially to construction site labor costs.

In order to reduce the time involved in installing anchor bolts, single piece anchors have been developed which are driven into pre-drilled masonry holes, thereby obviating the need to turn in an anchor bolt to expand a wedging shell. Thus, the patent to Nillson, U.S. Pat. No. 3,894,469, discloses a nail-like anchor which when hammered into a hole has a weakened portion that is deformed by this action to effect the desired wedging. The Gutshall U.S. Pat. No. 3,518,915 also shows a one-piece expandable anchor.

Also of prior art interest is the single piece anchor marketed under the trademark "Rawl Drive" by The Rawlplug Company, Inc., of New Rochelle, N.Y. This anchor has a resilient shank, an intermediate section of which is split into two half sections having a semi-circular cross-section. These are expanded in opposite directions in the plane of the split. The unsplit diameter of the shank is significantly smaller than the diameter of the masonry hole in which the anchor is to be installed, whereas the maximum diameter of the split section is somewhat greater than that of the hole.

When the "Rawl Drive" anchor is driven into a hole drilled in masonry, the expanded half sections thereof are compressed inwardly and straightened out. But because of the resilience of the half-sections, they seek to resume their normal expanded shape, thereby imposing an anchoring force on the wall of the masonry hole on opposite sides thereof.

A practical drawback of the "Rawl Drive" anchor is that the bulge created by the split and expanded half section has a maximum transverse dimension which is necessarily significantly greater than the diameter of the hole drilled in the masonry, and consequently is greater than the diameter of the mounting hole in the fixture to be attached to the masonry wall by the anchor bolt. Because a "Rawl Drive" anchor, before entering the masonry hole, must first pass through the mounting hole in the metal fixture, the use of conventional fixtures in conjuntion with "Rawl Drive" anchors is precluded. That is to say, one cannot use the "Rawl Drive" anchor with a fixture whose mounting hole has a diameter which corresponds to that of the drilled hole, which is usually the case, for the Rawl Drive anchor cannot go through this mounting hole.

The above-identified copending patent application discloses a one-piece anchor capable of being driven axially into a hole drilled in masonry to cause the inserted bolt to lodge securely therein to hold a fixture or other part against the masonry surface. The anchor is constituted by a pre-shaped shank formed of resilient material whose memory is such that when the shank is forcibly deformed it seeks to maintain its original shape, the shank being integral, with a drivable head and having a maximum cross section which does not substantially exceed the diameter of the hole.

The shank is pre-shaped to include at least one undulation which deviates from the longitudinal axis passing through the head to create a shank bend having a peak on one side of the shank and upper and lower bases on the other side thereof. When, therefore, the anchor is driven into the masonry hole, this force seeks to straighten out the bend, the resultant deformation thereof exerting outward pressures against large contact areas of the wall of the hole at the peak and at the bases, which multi-level pressures strongly resist axial withdrawal of the shank. This one-piece, pre-shaped anchor is now being marketed under the trademark SPIKE and will hereinafter be referred to by this mark.

Among the significant advantages of a SPIKE anchor are (a) ease of insertion to facilitate high-speed installations, (b) an assured multi-level gripping action when the anchor is fully inserted in the hole, (c) a tight attachment of the fixture or other part held against the masonry surface, (d) a high level of holding power due to relatively large contact surface areas, and (e) an ability to go through the mounting hole of a fixture whose diameter corresponds to that of the hole drilled in masonry.

In installing a one-piece anchor of the SPIKE or any other type, one must first drill a hole in the masonry and then hammer the anchor into the drilled hole. In drilling the hole in hard masonry, the conventional practice is to make use of a standard rotary-impact drill-hammer having a chuck which grips a drill bit having a carbide tip, for conventional drill bits are ineffective in this material. The drill-hammer serves not only to rotate the bit but also to reciprocate it axially, so that the rotating bit is periodically impacted at a rapid rate into the masonry to facilitate the drilling action. This drillhammer makes it possible to drill the required holes at high speed; and when at a given construction site hundreds or thousands of holes must be drilled in masonry, the drill-hammer effects a considerable saving in drilling time.

But what significantly slows down installation of anchors on a large scale is the need to hammer each anchor into a drilled hole. The use of manually-operated hammers for this purpose, when hundreds or thousands of anchors must be driven into drilled masonry holes, is not only a time consuming and labor intensive operation, but because of its energy requirements, the installer may reach a point of exhaustion in a fairly short period, for each anchor requires substantial effort to be driven into place.

Moreover, with a manually-operated hammer, the installer must exercise care to be sure that with each blow of the hammer he correctly strikes the head of the anchor; for should the installer mis-strike, he may inflict damage on the masonry region adjacent the hole.

While powered hammers, such as pneumatic hammers, are available which do not entail effort on the part of the user to effect a hammering action, these powered hammers must be manipulated by the installer to be sure that the hammer correctly strikes the head of the anchor. Should a mis-strike occur, the adjacent masonry region may be damaged.

SUMMARY OF INVENTION

In view of the foregoing, the main object of this invention is to provide an automatic setting tool operatively coupled to a standard rotary-impact drill-hammer for driving an anchor into a hole drilled in masonry, whereby the installation of anchors can be carried out in a simple, almost effortless and rapid manner.

While the invention will be described herein as it operates to install single-piece, pre-shaped anchors of the SPIKE type into a drilled masonry hole, it is to be understood that it is also operable with "Rawl Drive" and other drivable anchors having heads intended for hammers.

More particularly, an object of this invention is to provide a setting tool which is in a form that lends itself to be slipped onto a drill bit gripped by the chuck of a standard drill-hammer, or in a form that lends itself to be directly gripped by the chuck, the tool in either form acting to drive an anchor into a drilled masonry hole.

Thus, in cases where the installer is working alone and is called upon to both drill a masonry hole and to then drive an anchor therein, he can after drilling the hole with a standard drill-hammer, then slip the first form of setting tool on the drill bit to drive the anchor into the hole, thereby dispensing with the need for a manual hammer and its attendant drawbacks.

And in cases where two operators are available to carry out the installation, one to drill masonry holes and the other to drive anchors therein, the first operator can make use of a standard drill-hammer with a suitable drill bit held in its chuck to drill the masonry holes, while the second operator can use a like drill-hammer with the direct-coupled form of setting tool gripped in its chuck to drive anchors into holes drilled by the first operator.

A significant advantage of the invention is that it obviates the need for skill on the part of the installer, for the head of each anchor to be driven is nested in a tool socket and remains therein as the anchor is being hammered, so that the anchor is never misaligned with the tool and there is no danger of mis-striking. Because of this advantage, no damage is inflicted on masonry regions adjacent the holes, even when the installer is under pressure to install hundreds of anchors in a relatively short period and may therefore tend to become careless.

Yet another object of the invention is to provide setting tools of the above type which can be manufactured at low cost and which operate reliably and efficiently.

Briefly stated, these objects are attained in an automatic setting tool operatively coupled to a standard, rotary-impact drill-hammer for driving the shaped shank of a single piece anchor having an enlarged head into a hole drilled in masonry. The tool includes a rod having a front striker section and a rear holder section, a shoulder being formed at the junction of these sections. The holder section of the rod is adapted either to slip onto a drill bit held in the chuck of the drillhammer or to be directly gripped by this chuck, whereby the rod, as it is rotated the drill-hammer, is caused periodically to undergo a forward and a reverse stroke. Telescoped over the striker section and slidable thereon is a locator sleeve that is urged by a helical spring interposed between the shoulder and the sleeve to an initial position at which the sleeve projects beyond the front end of the rod to define therewith a socket for nesting the head of the anchor. In operation, when the shank of the anchor is placed in the entry of the drilled masonry hole and the head thereof which is nested in the socket is struck by the striker section during each forward stroke to drive the shank further into the hole, the spring is then compressed and the depth of the socket is reduced without, however, dislodging the head of the anchor therefrom. As a consequence, the alignment between the tool and the anchor is maintained in the course of the driving action.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is an elevational view of a single-piece, pre-shaped single bend anchor to be driven into a hole drilled into masonry;

FIG. 2 illustrates the anchor after it is driven into a hole drilled in masonry to attach a fixture against the masonry surface;

FIG. 3 is a perspective view of one form of setting tool in accordance with the invention;

FIG. 4 is a longitudinal section taken through the setting tool;

FIG. 5 illustrates the setting tool when it is gripped by the chuck of a rotary-impact drill-hammer to drive an anchor into a hole drilled in masonry;

FIG. 6 a section taken through the tool to show how the head of anchor is initially socketed therein;

FIG. 7 is same as FIG. 6, except that the anchor head is shown as positioned within the socket at the conclusion of the stroke of the drill-hammer;

FIG. 8 illustrates, partly in section, a second form of a setting tool in accordance with the invention which is adapted to slip a drill bit for a standard drill hammer; and FIG. 9 shows the drill bit held in the chuck of the hammer, with the tool slipped thereon to drive an anchor into a drilled hole.

DESCRIPTION OF INVENTION

Pre-Shaped Anchor:

Referring now to FIGS. 1 and 2, there is shown a one-piece, pre-shaped anchor of the type shown in my above-identified copending application, which is drivable into a hole 10 drilled in masonry 11, the anchor serving to attach a fixture 12 against the surface of the masonry, the fixture having a mounting hole 12H.

The anchor is constituted by a shank 13 fabricated of carbon or work hardened stainless steel, or other material having a circular cross section whose diameter is constant throughout the length of the shank, the tip 14 of the shank being of reduced diameter and chamfered to facilitate insertion in hole 10. The diameter of hole 10 is equal to or slightly larger than the shank diameter. The upper end of shank 13 is integral with an enlarged head 15 which in the anchor illustrated has a cylindrical form. However, SPIKE anchors are also commercially available with mushroom shaped heads.

Shank 13 is pre-shaped to create an undulation therein which deviates from the longitudinal axis X passing through the center of head 15 to create a curved bend U which is offset with respect to this axis. After the bend is formed, the shank is rendered resilient by tempering the metal at a temperature appropriate thereto to impart a memory thereto, such that when the shank is thereafter forcibly deformed, it seeks to recover its original shape.

When, therefore, the anchor is driven by a hammer or other means adapted to strike head 15, the shank 13, as it advances axially into masonry hole 10, forces bend 16 to straight out, in order to gain entry thereto. This forcible deformation of bend U causes the bend to exert outward pressures against the wall of hole 10 at different levels therein as it seeks to recover its original shape. These lateral pressures offer a considerable resistance to axial withdrawal of the shank from the hole. Hence the anchor, despite its simplicity, is capable of supporting substantial loads on the masonry wall. The holding capacity depends, of course, on the dimensions and configurations of the bolt and the nature of its metal. In practice, anchors of this type may be designed for supporting loads as heavy as 2000 lbs. or greater.

In order to appreciate the fact that the pressures exerted against the wall of the hole are imposed at different levels, the nature of bend 16 must be further analyzed. Bend 16 has a peak P on one side of the shank. As shown in FIG. 1, peak P represents the point of maximum offset from the longitudinal axis X of the shank, this point being well outside the periphery of the drilled, non-tapped masonry hole for which the anchor bolt is intended.

The bend also has a lower base $B_1$ on the other side of the shank which is at a level below peak P, and an upper base $B_2$ which is at a level above peak P. When, therefore, as shown in FIG. 3, the shank is driven into masonry hole 10 to more or less straighten out the bend, the resilient bend, because it seeks to recover its original shape, exerts a first holding force $F_p$ at a level where its peak presses against the corresponding side of the wall of the hole, a second holding force $F_{B1}$ at a lower level where base $B_1$ of the bend presses against the opposite side of the hole, and a third holding force $F_{B2}$ at a higher level where the base $B_2$ of the bend presses against the opposite side of the wall of the hole. Hence, the holding forces are not concentrated at one level but are distributed along the length of the hole to develop a substantial holding power.

Setting Tool (Form A)

The setting tool illustrated in FIGS. 3, 4 and 5 is adapted to be operatively coupled to a standard electrically-powered drill-hammer D-H having a chuck 19. The tool, generally designated by reference numeral 16, is directly gripped by the jaws of the chuck of the drill-hammer so that when the drillhammer is actuated, the tool is then caused to rotate and reciprocate.

Among commercially available, rotary-impact drill-hammers are the Electro-Pneumatic Rotary Hammers marketed by AEG, such as models PH 38 and PH 16RL. These are relatively light-weight and utilize and electro-pneumatic hammering system with very high impact for drilling into extremely hard concrete. In a drill-hammer of this type, a piston is caused by an eccentric to reciprocate within a cylinder. In front of the piston is a free-floating percussive body. When the piston reverses direction in the cylinder, it compresses the air therein to move the percussive body forward to strike the drill bit. This action takes place thousands of times per minute.

Tool 16 includes a rod of stainless steel or other suitable high-strength, corrosion-resistant material which is machined to defined a front striker section 17 and a rear holder section 18. Holder section 18 is provided with a first pair of diametrically-opposed, elongated grooves $18G_1$, and a second and smaller pair of grooves $18G_2$, the first pair lying on a diametrical axis normal to the diametrical axis passing through the second pair. These grooves correspond to those found on standard drill bits and serve to prevent slippage of the tool when gripped by the jaws of the chuck.

The leading portion 18L of rear section 18 is of enlarged diameter to define at the junction of this section and front section 17 of the rod an abutment or shoulder 20.

Telescoped on striker section 17 is a cylindrical locator sleeve 21. Striker section 17 of the rod is slidable relative to sleeve 21 within limits fixed by a longitudinal slot 22 on the sleeve in which is trapped a pin 23 anchored on the front section.

Interposed between sleeve 21 and shoulder 20 and surrounding front section 17 is a helical compression spring 24. Spring 24 urges sleeve 21 to project beyond the front end of front section 17 to an extent limited by pin 23 which then abuts the rear end of slot 22, as shown in FIGS. 3 and 4. The maximum extent to which sleeve 21 can be retracted on the front section 17 and in doing so compress spring 24, is limited by the front end of slot 22 which then abuts pin 23.

The projection of sleeve 21 beyond the front end of front section 17 of the rod defines a cylindrical socket 25 therebetween whose dimensions are such as to loosely nest head 25 of the anchor, as shown separately in FIG. 6.

When therefore, setting tool 16 is held in chuck 19 of drill-hammer D-H and trigger switch 26 of the drill-hammer is actuated by the operator, the drill-hammer then proceeds to rotate and reciprocate the tool, as it would a drill bit.

To install a SPIKE or other shaped, single-piece anchor which includes a wedging means of some sort on its shank, one must first drill a hole in the masonry. After drilling the hole, the head 15 of the anchor is nested in socket 25 of the setting tool, the shank of the anchor being inserted into the entry of the hole. Drill-hammer D-H held by the operator is pushed toward the hole where it meets resistance because of the bend in the pre-shaped anchor.

The striker section 17 of the rod which is being reciprocated by drill-hammer D-H then proceeds with each forward stroke to drive the anchor deeper into the hole. As the anchor head approaches the wall, sleeve 21 comes into contact with the fixture 12 being fastened. With repeated strikes the bend is straightened out and the shank is hammered home in the drilled hole.

With each forward stroke of the rod relative to the sleeve, spring 24 is compressed and socket 25 is then reduced in depth. But the parameters of the tool and of the reciprocating movement of the drill-hammer are such that, as shown in FIG. 7, while the depth of socket 25 is reduced, head 15 remains nested therein so that it cannot laterally be dislodged.

In this way, alignment of the tool and anchor is maintained in the course of the hammering action. When the anchor is fully installed, the drill-hammer to which the tool is operatively coupled is withdrawn. The entire installation procedure from start to finish, including the drilling of a hole, usually takes less than a minute.

The tool shown in FIGS. 3 to 5 is especially useful in roofing installations and in similar types of work where more than one operator is available for installing a large number of SPIKE anchors. To expedite this installation, one operator uses a standard drill-hammer with a drill bit gripped in its chuck just to drill holes. Another operator, also equipped with a standard drill-hammer, operatively couples the setting tool to his drill-hammer, his job being just to drive in the SPIKE anchors. Working together, these operators can drill holes in the roofing and drive SPIKE anchors therein at a remarkably rapid rate without in any way doing damage to the masonry regions surrounding the holes.

Setting Tool (Form B):

There are many situations in which it is necessary to install one anchor at a time before shifting to another anchor site. Thus, in installing air conditioning ducts and similar equipment, the ducts are affixed to a masonry wall in successive sections, and the present practice is for the installer to drill a hole in the wall with a standard drill-hammer, and to then, with a conventional hammer, drive an anchor into the drilled hole.

In the Form B setting tool shown in FIGS. 8 and 9, generally designated by reference numeral 27, the tool is adapted to slip onto a drill bit suitable for masonry, such as drill bit 28. This bit is provided with a front drilling section 28F having a spiral cutting thread and a carbide tip, and a holding rear section 28R adapted to fit into and be gripped by the jaws of chuck 19 of a standard drill-hammer. It is to be noted that the holding section of the drill bit is similar to the corresponding section 18 of the setting tool shown in FIGS. 3 and 4.

Setting tool 27 is adapted to slip over the drilling section 28F of the drill bit, so that after an installer drills a hole with his drill-hammer, he can then slip setting tool 27 over the drill bit and proceed to hammer in a pre-shaped anchor.

The practical advantage of a Form B setting tool over Form A is that in order to couple the Form A setting tool to a drill-hammer, one must first remove the drill bit therefrom, whereas the Form B tool does not have this requirement, for the tool slips over the bit.

The Form A setting tool is best suited, therefore, for those situations in which two drill-hammers and two operators are available; one using a bit to drill holes and the other using a setting tool to hammer anchors into the drilled holes. The Form B setting tool is best suited for those situations in which only one drill-hammer and one operator are available, for the same drill hammer can then be used both to drill a hole and to drive an anchor into the drilled holes.

The Form B setting tool includes a rod having a front striker section 29 and a rear holder section 30, a sleeve 31 being telescoped on the front section and being retained thereon by a pin 32 anchored on the front section and trapped within a slot 33 formed in the sleeve. A helical spring 34 surrounding the front section is interposed between sleeve 31 and a shoulder 30S formed at the junction of the front and rear sections of the rod.

To this extent, the Form B setting tool has an arrangement in regard to its front section which corresponds to that included in the Form A tool. The difference resides in the nature of rear section 30, which in Form B is provided with a bore 35 that extends along the longitudinal axis of the rod.

Bore 35 has a depth and form adapted to accommodate the full length of the front section 28F of the drill bit 28 as well as the enlarged conical shoulder 28S at the junction of front section 28F and rear section 28R. The rear end of bore 35, which is shaped to accommodate shoulder 28S of the bit is provided with an O-ring 36 which frictionally engages shoulder 28S to retain the tool in the bit.

When, as shown in FIG. 9, drill bit 28 is gripped by chuck 19 of the drill-hammer and setting tool 27 is slipped over the bit and retained thereby, so that the setting too is operatively couples to the drill-hammer, one can then place head 15 of an anchor in the socket 37 defined between the front end of front section 29 of the rod and the projecting end of sleeve 31 and drive this anchor into a hole previously drilled in masonry by the same drill bit.

While there has been shown and described a preferred embodiment of an automatic setting tool for masonry anchors in accordance with the invention, it will be appreciated that many changes and modifications made be made therein without, however, departing from the essential spirit thereof.

I claim:

1. An automatic setting tool adapted to be operatively coupled to the chuck of a drill-hammer for driving the shank of an anchor having a head into a hole drilled in masonry by a drill bit which is grippable by the jaws of the chuck, said tool comprising:

A a rod having a front striker section and a rear holder section, said holder section being adapted either to slip onto a drill bit held by the jaws of the chuck or to be directly gripped thereby, whereby the rod as it is actuated by the drill-hammer is caused to periodically undergo a forward hammering stroke;

B a location sleeve telescoped over the striker section and slidable thereon from an initial position to a retracted position; and C compressible means interposed between the sleeve and a point on the rod urging said sleeve to said initial position at which the sleeve projects beyond the front end of the rod to define therewith a socket for nesting the head of the anchor, whereby when the shank of the anchor is inserted into the entry of the drilled hole and the head thereof nested in said socket is struck by the striker section, then during each forward stroke of the rod the shank is driven further into the hole, said means being compressed to cause said sleeve to assume said retracted position at which the depth of the socket is reduced without dislodging the head therefrom, as a consequence of which the alignment between the tool and the anchor is maintained in the course of the driving action.

2. A tool as set forth in claim 1, wherein said compressible means is a helical spring surrounding the striker section interposed between the sleeve and a shoulder formed at the junction of the striker and holder sections.

3. An automatic setting tool as set forth in claim 1, wherein said sleeve is provided with a longitudinal slot within which is trapped a pin anchored on the striker section to limit the degree to which the sleeve is projected beyond the front end of the rod to assume its initial position and the degree to which the sleeve can be retracted from this position.

4. An automatic setting tool as set forth in claim 1, wherein said holder section is in a form similar to that of a conventional drill bit, so that the tool may be gripped in the chuck.

5. An automatic setting tool as set forth in claim 1, wherein said holder section is provided with a longitudinally extending bore to accommodate the drill bit whereby the tool may be slipped over the bit when the bit is held in the chuck.

6. An automatic setting tool as set forth in claim 5 wherein said holder section is provided with an O-ring surrounding the bore adjacent the rear end thereof to frictionally engage the drill bit.

7. An automatic setting tool as set forth in claim 1, made of work-hardened steel.

* * * * *